United States Patent
Chang et al.

(10) Patent No.: US 12,468,373 B2
(45) Date of Patent: Nov. 11, 2025

(54) INFORMATION HANDLING SYSTEM MULTI-STAGE LID HOUSING CONTROL

(71) Applicant: Dell Products L.P., Round Rock, TX (US)

(72) Inventors: Chen Hsin Chang, Keelung (TW); Yaotsung Chang, Taipei (TW); Li-Min Wu, Taoyuan (TW)

(73) Assignee: Dell Products L.P., Round Rock, TX (US)

( * ) Notice: Subject to any disclaimer, the term of this patent is extended or adjusted under 35 U.S.C. 154(b) by 100 days.

(21) Appl. No.: 18/384,953

(22) Filed: Oct. 30, 2023

(65) Prior Publication Data

US 2025/0138622 A1    May 1, 2025

(51) Int. Cl.
| | | |
|---|---|---|
| G06F 1/00 | (2006.01) | |
| G06F 1/16 | (2006.01) | |
| G06F 1/3218 | (2019.01) | |
| G06F 1/3234 | (2019.01) | |
| G06F 1/3203 | (2019.01) | |

(52) U.S. Cl.
CPC .......... *G06F 1/3265* (2013.01); *G06F 1/1616* (2013.01); *G06F 1/1647* (2013.01); *G06F 1/3218* (2013.01); *G06F 1/3203* (2013.01)

(58) Field of Classification Search
CPC .... G06F 1/3265; G06F 1/1616; G06F 1/1647; G06F 1/3218
USPC ........................................................ 713/323
See application file for complete search history.

(56) References Cited

U.S. PATENT DOCUMENTS

| | | | |
|---|---|---|---|
| 7,849,334 B2* | 12/2010 | Juenemann | G06F 1/3203 455/574 |
| 8,555,099 B2* | 10/2013 | Marinkovic | G06F 1/3203 345/545 |
| 10,912,035 B2* | 2/2021 | Pingili | G06F 9/4418 |
| 11,379,016 B2 | 7/2022 | Cooper et al. | |
| 2004/0133817 A1* | 7/2004 | Choi | G06F 1/162 713/300 |
| 2006/0139326 A1* | 6/2006 | Tsukamoto | G06F 1/3218 345/158 |
| 2007/0050473 A1* | 3/2007 | Lee | G06F 1/3203 709/217 |
| 2013/0275742 A1* | 10/2013 | Shao | G06F 1/1675 713/100 |
| 2014/0226276 A1* | 8/2014 | Sung | G06F 1/1681 361/679.27 |
| 2017/0235355 A1* | 8/2017 | Alshinnawi | G06F 1/1677 713/323 |
| 2019/0278339 A1* | 9/2019 | Cooper | G06F 3/04817 |
| 2021/0055779 A1* | 2/2021 | Lai | G06F 1/3234 |
| 2021/0149441 A1* | 5/2021 | Bartscherer | G06F 1/1616 |

(Continued)

*Primary Examiner* — Volvick Derose
(74) *Attorney, Agent, or Firm* — Zagorin Cave LLP; Robert W. Holland

(57) ABSTRACT

A portable information handling system manages power consumption by selectively powering down an integrated display when the housing rotational orientation indicates that visual images have less end user utility, such as between 15 and 80 degrees of open rotation. When the information handling system has a peripheral display interfaced, the central processing unit and graphical processing unit continue to operate to present information as visual images at the peripheral display while the integrated display powers down to reduce power consumption.

20 Claims, 6 Drawing Sheets

(56) References Cited

U.S. PATENT DOCUMENTS

| | | | |
|---|---|---|---|
| 2021/0311598 A1* | 10/2021 | Bernstein | G06F 3/0483 |
| 2022/0068210 A1* | 3/2022 | Liao | G09G 3/3225 |
| 2022/0261063 A1* | 8/2022 | Sultenfuss | G06F 1/3265 |
| 2024/0019898 A1* | 1/2024 | Patel | G06F 1/263 |
| 2025/0085750 A1* | 3/2025 | Morrison | G06F 1/183 |

* cited by examiner

INFORMATION HANDLING SYSTEM MULTI-STAGE LID HOUSING CONTROL

BACKGROUND OF THE INVENTION

Field of the Invention

The present invention relates in general to the field of portable information handling systems, and more particularly to an information handling system multi-stage lid housing control.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems integrate processing components, a display and a power source in a portable housing to support mobile operations. Portable information handling systems allow end users to carry a system between meetings, during travel, and between home and office locations so that an end user has access to processing capabilities while mobile. Tablet configurations typically expose a touchscreen display on a planar housing that both outputs information as visual images and accepts inputs as touches. Convertible configurations typically include multiple separate housing portions that couple to each other so that the system converts between closed and open positions. For example, a main housing portion integrates processing components and a keyboard and rotationally couples with hinges to a lid housing portion that integrates a display. In a clamshell configuration, the lid housing portion rotates approximately ninety degrees to a raised position above the main housing portion so that an end user can type inputs while viewing the display. After usage, convertible information handling systems rotate the lid housing portion over the main housing portion to protect the keyboard and display, thus reducing the system footprint for improved storage and mobility.

As a result of hybrid work situations, end users often have a convertible information handling system that they use in both an enterprise office and a home office. In both offices, the end user will often keep peripheral devices to support interactions with the information handling system, such as peripheral keyboards, mice and displays. Peripheral devices tend to have a larger area for interactions so that peripheral devices are more convenient to work with than the keyboard, touchpad and display integrated in the portable housing. In particular, peripheral displays offer a much larger presentation of visual images to aid the end users viewing of information. An end user can quickly interface with multiple peripheral displays through direct cable connections to each display or through a docking station. In some instances, the end user will want to continue viewing information on the integrated display while also viewing the peripheral displays, while in other instances the end user will want to turn off the integrated display and use only the peripheral displays. Typically the end user can select a preference in the system settings so that closing the portable housing has the desired result. When an end user elects to continue presenting visual images at the integrated display, then closing the lid housing portion over the main housing portion will typically command a power down state, such as a transition from ACPI S0 on state to S3/S4 sleep state or modern standby mode. This is a convenient tool for end users to reduce power consumption while the system is not in use yet and have a rapid wake time when the housing is rotated open.

One common practice when presenting visual images at both the integrated display and a peripheral display is to partially close the housing lid portion when the integrated display presentation is not wanted, such as when the lid housing portion interferes with viewing of the peripheral display or when the end user does not want an integrated camera directed towards him. Partially closing the lid housing portion continues the presentation of visual images and does not initiate a reduced power state transition. One difficulty with this approach is that the information handling system power consumption remains full on with the presentation of visual images that the end user does not want and/or need. An end user can change the display configuration settings to turn off the display, however, that takes time and effort, plus the desire to only partially close the housing lid portion is often temporary so that a change in configuration settings will have to be changed back and forth often.

SUMMARY OF THE INVENTION

Therefore, a need has arisen for a system and method which reduces power consumption when viewing an integrated display with a partially shut housing.

In accordance with the present invention, a system and method are provided which substantially reduce the disadvantages and problems associated with previous methods and systems for managing information handling system power consumption by an integrated display. The information handling system housing rotational orientation is monitored to detect a partially-closed state indicative of non-viewing of the integrated display by an end user. In response to detection of the partially-closed state, the integrated display transitions to a lower power state while information handling system processor remains in a power on state.

More specifically, an information handling portable housing lid portion and main portion rotationally couple to rotate between a closed position and an open position. In the open position, a processor of the information handling system processes information for presentation at an integrated display in the housing lid portion. When the housing rotates from the open position to a closed position, the processor and display transition to a reduced power state, such as ACPI S3/S4 sleep state or modern standby mode. When the housing rotates to a partially-closed position having a rotational orientation of between the open position and closed position, the processor remains operational to process information for presentation at a peripheral display while the integrated display transitions to a display low power state that reduces power consumption, such as by turning off the display backlight. When in the partially-closed housing rotational orientation, the housing can transition back to an open state that wakes presentation at the integrated display or to a closed state that sleeps the processor and display. When in the closed position, transition of the housing rotational orientation to a partially-closed position wakes the processor and leaves the integrated display in a low power state. In one example embodiment, turning off a backlight to reduce integrated display power consumption saves 2.5 W of power, which accounts for 40% of the example system's power consumption. In another implementation example, other power saving actions may be used, such as turning off the LCD timing controller (T-Con) and backlight simultaneously to save additional energy.

The present invention provides a number of important technical advantages. One example of an important technical advantage is that an information handling system reduces power consumption by turning off an integrated display when the housing rotational orientation indicates that an end user does not want to view the integrated display but does want to continue with processor operations. For instance, during a housing rotational orientation of between 15 and 80 degrees, the display backlight is turned off to reduce system power consumption and preserve battery charge. When the housing rotational orientation returns to a normal viewing angle, such as 90 degrees or greater, the integrated display again presents visual images, such as by turning a backlight from off to on. During the display low power mode, a graphics processor may continue presenting visual images at a peripheral display and also applying visual information to the display panel with the backlight off so that a rapid recovery is supported when the backlight is turned on.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A portable information handling system manages power consumption by powering down an integrated display at defined housing rotational orientations while presenting visual images at a peripheral display. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
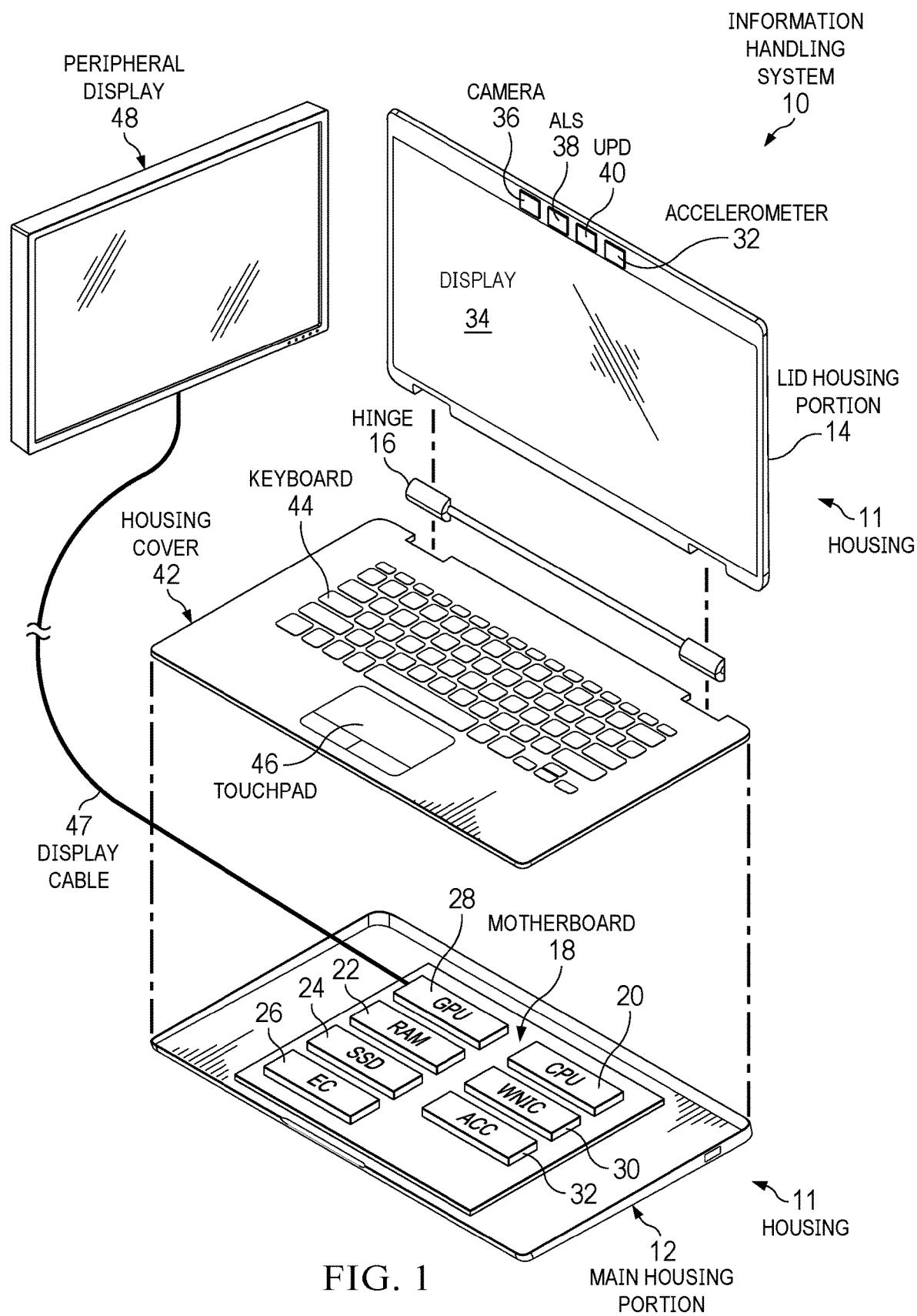
FIG. 1 depicts an exploded perspective view of a portable information handling system configured to reduce power consumed by an integrated display at defined housing rotational orientations.

Referring now to FIG. 1, an exploded perspective view depicts a portable information handling system 10 configured to reduce power consumed by an integrated display 34 at defined housing rotational orientations. Portable information handling system 10 is built in a portable housing 11 having a main housing portion 12 rotationally coupled to a lid housing portion 14 by a hinge 16 to rotate between open and closed positions. A motherboard 18 coupled in main housing portion 12 interfaces processing components that cooperate to process information. For example, a central processing unit (CPU) 20 executes instructions to process information in cooperation with a random access memory (RAM) 22 that stores the information and instructions. A solid state drive includes non-transient memory, such as flash integrated circuits, that provide persistent storage of instructions and information, such as an operating system and applications that execute on CPU 20 when retrieved to RAM 22. An embedded controller 26 manages physical operating conditions in the housing, such as application of power and interactions with peripheral input devices. A graphics processing unit (GPU) 28 interfaces with CPU 20 to further process information to define visual images, such as pixel values that define colors presented on pixels of display 34. A wireless network interface controller (WNIC) 30 supports wireless communication with external networks and devices, such as through wireless local area networks (WLAN) and wireless personal area networks (WPAN). An integrated display 34 couples in housing lid portion 14 and interfaces with GPU 28 and/or CPU 20 to present information as visual images. A camera 36, ambient light sensor (ALS) 38, user presence detection sensor 40 and an accelerometer 32 couple to housing lid portion 14 and communicate with motherboard 18. A housing cover portion 42 couples over housing main portion 12 to protect the processing components and support a keyboard 44 and touchpad 46 that accept end user inputs.

During normal operations, processing components of information handling system 10 cooperate to process information and present the information as visual images at display 34. In addition, visual images may be presented at a peripheral display 48 that is separate from housing 11 and interfaced with GPU 28 through a display cable 47, such as a Type C USB cable, or through wireless communications by WNIC 30. An operating system retrieved from SSD 24 and executing on CPU 20 manages power states of information handling system 10, such as in accordance with the Advanced Configuration and Power Interface (ACPI) standard S0 (on state) through S5 (off state). For example, when housing 11 rotates from an open position to a closed position, information for the operating condition is stored in RAM 22 and CPU 20 is transitioned to an off state. This low power state preserves battery and reduces power consumption while offering a rapid restart of the information handling system since the operating conditions are available in RAM for the CPU to restart. The housing rotational orientation is monitored by accelerometers (ACC) 32 in housing lid portion 14 and main portion 12, such as by comparing the orientation of each relative to gravity with instructions on the embedded controller and communicating the lid state through a GPIO to the CPU. In an alternative embodiment, other rotational orientation sensors may be used, such as rheostat coupled to hinge 16 or a magnet and Hall sensor that detect define positions, such as contact in the closed position of the housing lid and main portions.

When an end user is interacting through peripheral display 48, the end user may have some occasions to partially close housing 11 while still wanting CPU 20 to remain active and support interactions through the peripheral display. In order to accomplish this, instructions executing on CPU 20 (or other available processors like embedded controller 26) monitors housing 11 rotational orientations for a defined range that indicates a desire by the end user to power down integrated display 34 while continuing to run CPU 20. In one example embodiment, the rotational orientation range for powering down the display is greater than 15 degrees open to less than 80 degrees open, although other embodiments may use different ranges. The display low power state rotational orientation is detected by comparing the orientations detected by accelerometers 32 and can be confirmed by other indications, such as a camera image captured below an end user vertical height (for instance, below the chin), changes in ambient brightness captured by ALS 38 and lack of user presence in a time of flight field of view. The display low power state is configurable through the operating system to include the rotational orientation range, the type of shut down performed at the display, and whether to continue to operate GPU 28. For instance, when a peripheral display is presenting visual images GPU 28 might stay active while the absence of a peripheral display may result in the GPU powering down or the processor entering the sleep state since no visual images are displayed. In some instances, an end user might want the processor to remain in the on state even though no peripheral display is available and the integrated display is in a reduced power state. Each of these options may be configured through the operating system.

Figure 2:
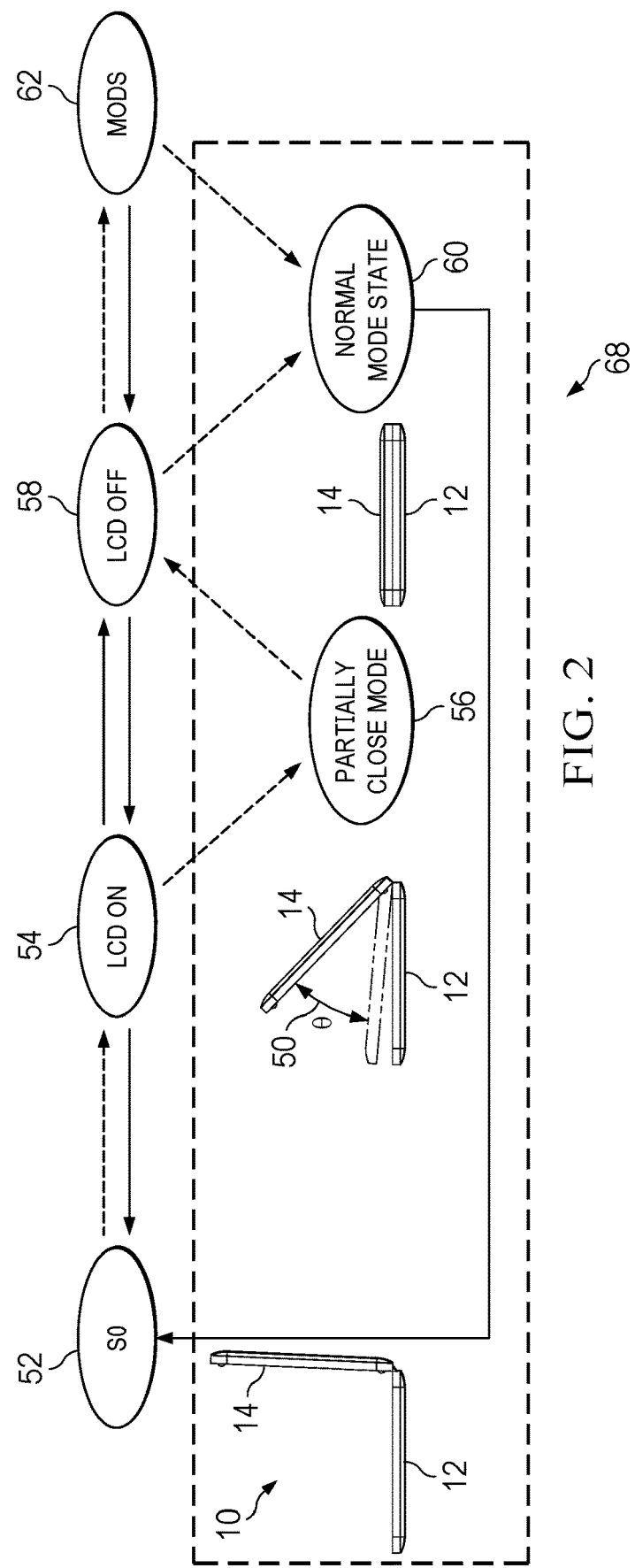
FIG. 2 depicts a flow diagram of a method for intelligent two-stage display presentation management based on housing rotational orientation.

Referring now to FIG. 2, a flow diagram depicts a method for intelligent two-stage display presentation management by logical elements 68 based on housing rotational orientation. At step 52, information handling system 10 is in the S0 on state with housing main portion 12 and lid portion 14 rotated to an open position of 90 degrees. In this "clamshell" position, the end user has access to the keyboard in housing main portion 12 while viewing the integrated display in housing lid portion 14. From step 52 the process has the display in an on state at step 54 to present visual images. At step 54 with the integrated display presenting visual images, housing lid portion 14 is rotated towards a closed position over housing main portion 12 to within a predetermined theta range of rotational orientation associated with a display low power state. At step 56 the housing rotational orientation is detected as in a partially closed mode, such as between 15 and 80 degrees open. As a result of the detection of the partially closed housing rotational orientation, the process continues to step 58 to a reduced power state for the display, such as powering down the display as a whole or the backlight and touch detection surface. From the partially closed housing rotational orientation the process continues to step 60 to detect a transition to a normal rotational orientation, such as open to a viewing position that commands S0 as at step 52 or completely closed that commands an S3 sleep or similar state. At step 62 the processor remains on for open or partially open housing rotational orientation and sleeps for closed housing rotational orientation. The process returns to step 52 when the information handling system rotates to the open position.

Figure 3:
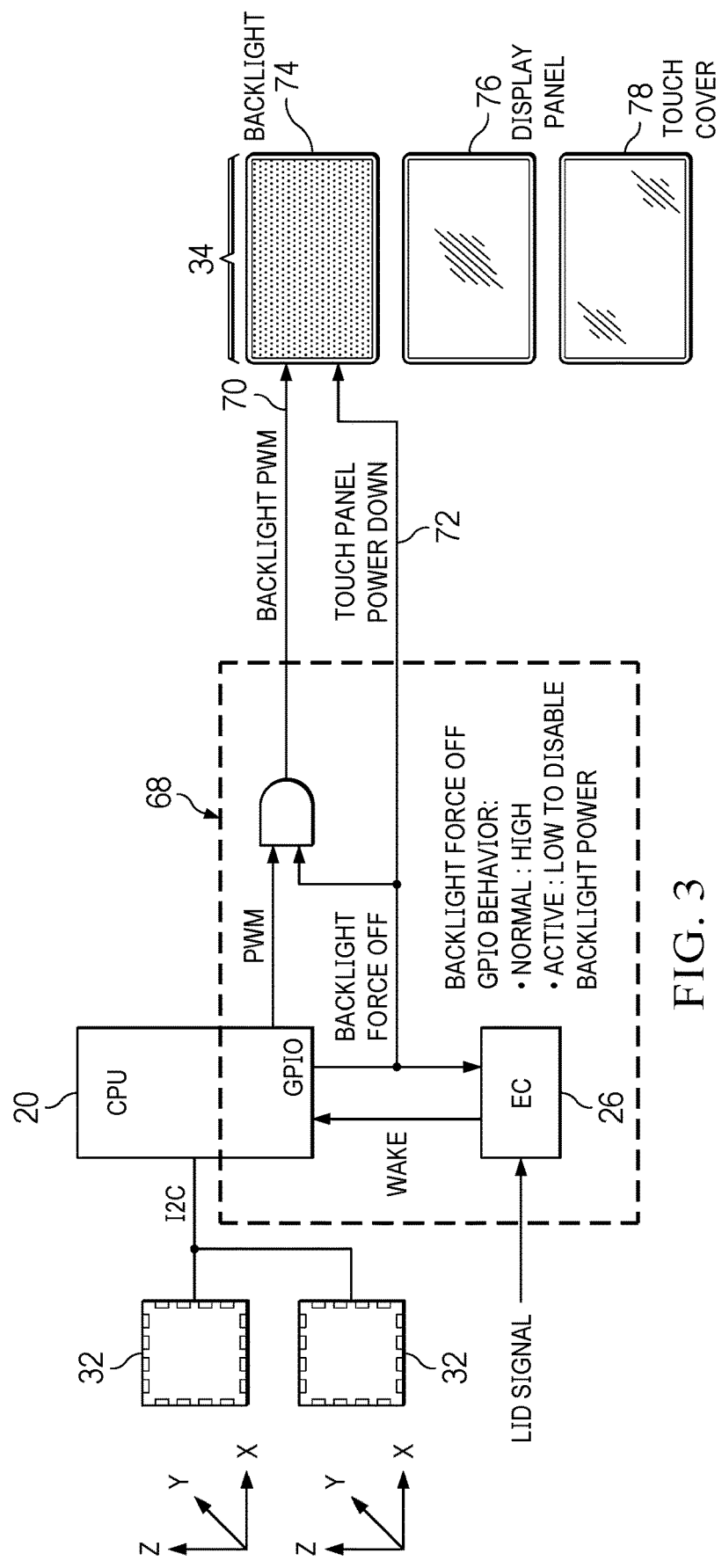
FIG. 3 depicts a block diagram of logical elements that cooperate to manage display power consumption when a housing rotational orientation is partially closed.

Referring now to FIG. 3, a block diagram depicts logical elements 68 that cooperate to manage display power consumption when a housing rotational orientation is partially closed. In the example embodiment, first and second accelerometers 32 monitor housing rotational orientation and report to an Integrated Sensor Hub (ISH) of CPU 20. An embedded controller 26 may monitor accelerometers in an alternative embodiment. In the example embodiment, a lid signal is provided to embedded controller 26 when a housing closed position is detected, such a Hall sensor in one housing portion detecting a magnet in the opposing housing portion. CPU 20 drives a PWM 70 to determine a backlight 74 illumination. In the example embodiment, display 34 is a liquid crystal display (LCD) having a backlight 74 that illuminates a display panel 76 of liquid crystal pixels and having a touch cover 78 with capacitive touch detection sensors. When CPU 20 detects a partially closed housing rotational orientation by comparing the accelerometer 32 values, a GPIO signal is provided to embedded controller 26 to manage power in the display low power state and to a logic device that turns off backlight PWM signals so that the backlight powers off. In addition, the GPIO signal is provided as a touch panel power down signal 72 to command power down of touch cover 78 capacitive touch detection sensors. In the example embodiment, the GPIO signal is high during normal operations and low when the display low power state is commanded to disable the backlight. In this implementation example, a GPIO may turn off the backlight, however other alternative embodiments may be used. For instance, the PWM duty cycle of the backlight control signal may be set to zero or the entire LCD may be powered off.

In the example embodiment, display 34 is an LCD display having a backlight that powers down to preserve power. In an alternative embodiment, the LCD panel may also power down to save additional power, although leaving the LCD panel active to receive GPU data helps to quicken recovery to the operational display state. In an alternative embodiment, display 34 is an organic light emitting diode (OLED) display that powers down application of current to the OLED pixels. In one embodiment, touch detection may remain active in the display lower power state so that an end user press on the display will signal a wake out of the display low power mode. When a peripheral display is active, CPU 20 will continue to generate visual information for presentation through its integrated graphics core or a separate GPU so that visual images are presented at the peripheral display during the integrated display's low power state. When a peripheral display is not present, the graphics core and/or GPU may power down in the display low power state to further reduce power consumption until the housing rotational orientation goes to the open position. In the example embodiment, the display low power state is commanded in the 15 to 80 degree housing rotational orientation. In alternative embodiments, the rotational orientation range may vary from a fully closed position detection to a 90 degree open position. The display low power state may be configured through the operating system to adjust the rotational orientation and other power saving behaviors.

Figure 4:
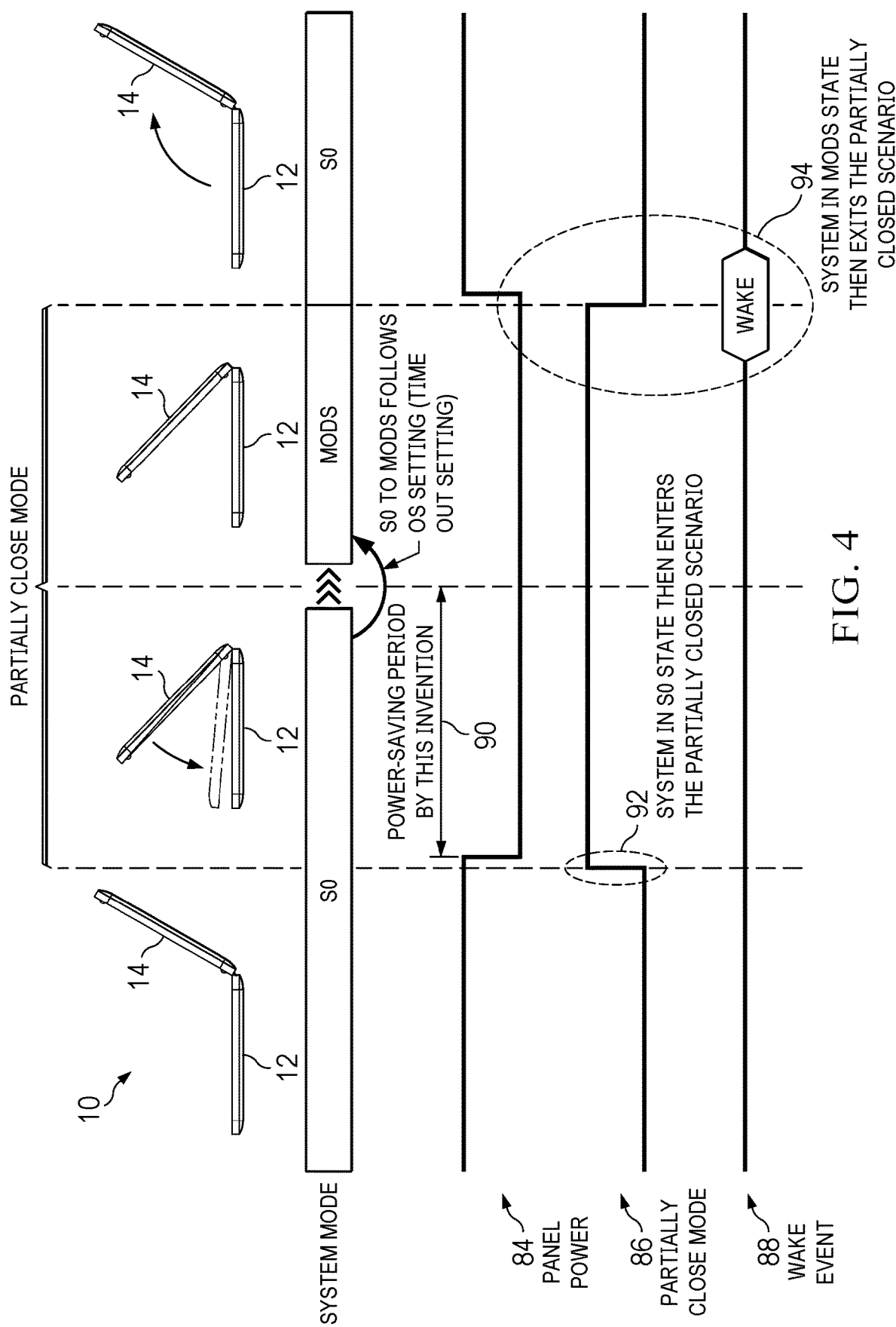
FIG. 4 depicts a flow diagram of a process for controlling display power consumption when an information handling system housing has a partially closed rotational orientation.

Referring now to FIG. 4, a flow diagram depicts a process for controlling display power consumption when an information handling system housing has a partially closed rotational orientation. The process starts in a S0 power on state with information handling system 10 having the housing lid portion 14 rotated greater than 90 degrees open relative to the housing main portion 12. Display panel power 84 is on, the partially closed mode 86 is off and no wake event 88 exists. When housing lid portion 14 closes relative to housing main portion 12, and a transition 92 in the partially closed mode indication 86 turns off the display backlight with a transition 90 in the display panel power 84. After a timeout period the S0 mode transitions to a modern standby mode based on the operating system idle time to sleep the processor. At a wake event, such as opening the housing past 90 degrees, a wake transition 94 commands a wake of the processor to the S0 state so that an analysis is performed of the housing rotational orientation. When the housing is in the open position, the display panel is powered on. When the housing is in the partially closed position, the processor wakes and the display panel remains powered down.

Figure 5:
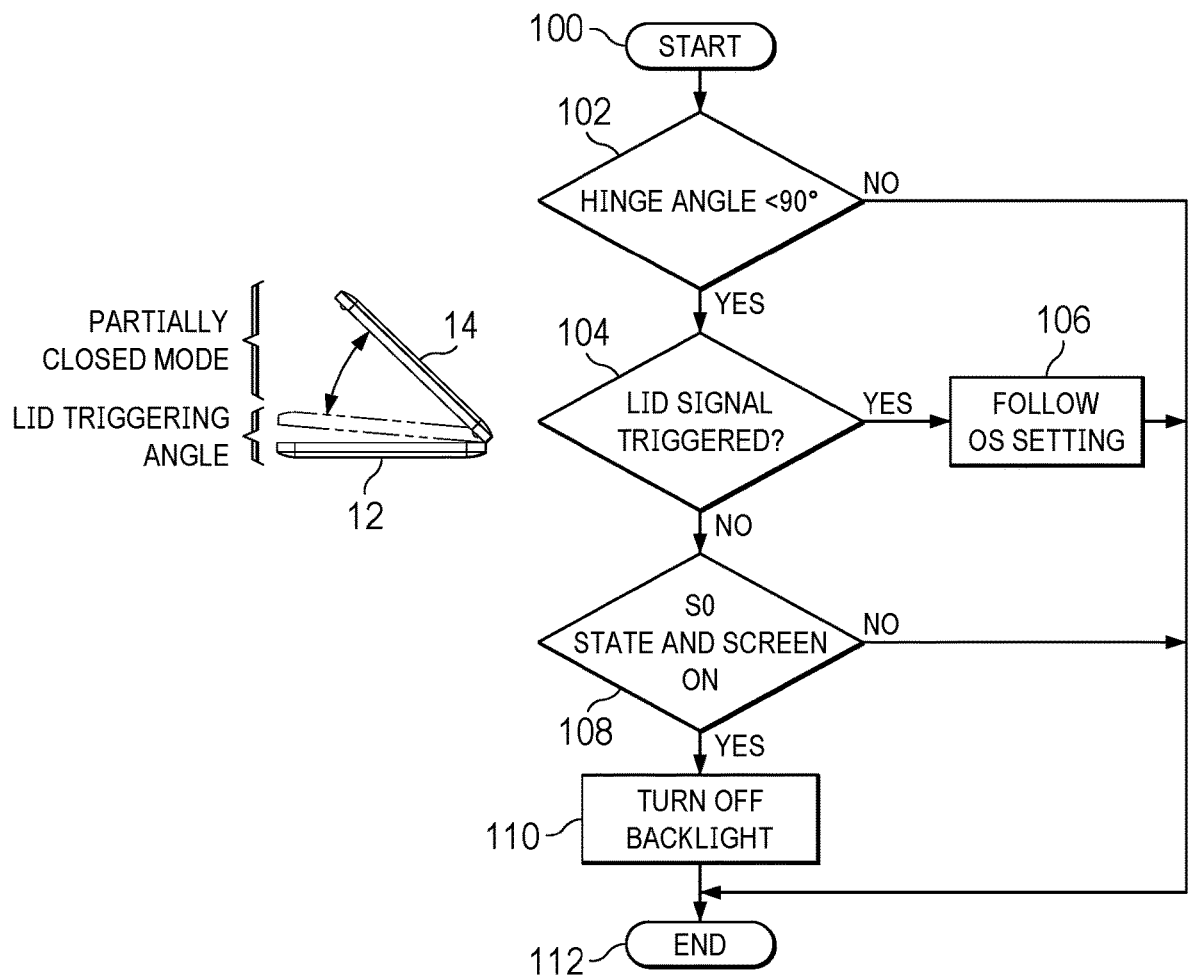
FIG. 5 depicts a flow diagram of a process for entry to a display low power state.

Referring now to FIG. 5, a flow diagram depicts a process for entry to a display low power state. The process starts at step 100 and at step 102 determines if the housing rotational orientation is less than 90 degrees. If not, the process ends at step 112. If the housing rotational orientation is less than 90 degrees, the process continues to step 104 to determine if a partially or fully closed trigger is hit. If the housing rotational orientation is in the closed rotational orientation, such as less than 15 degrees open, the process continues to step 106 to perform the operating system ACPI or similar setting, such as a transition to an S3/S4 sleep state or modern standby mode of the processor. If the full closed orientation is not met, the process continues to step 108 to determine if the partially closed orientation is met. Since the fully closed orientation is not met, the S0 state with the processor on and the display on is commanded. If the partially closed state is not detected, such as less than 80 degrees open, then the process ends at step 112. If the partially closed state is detected, such as between a range of 15 and 80 degrees open, the process continues to step 110 to turn off the display backlight and then ends at step 112.

Figure 6:
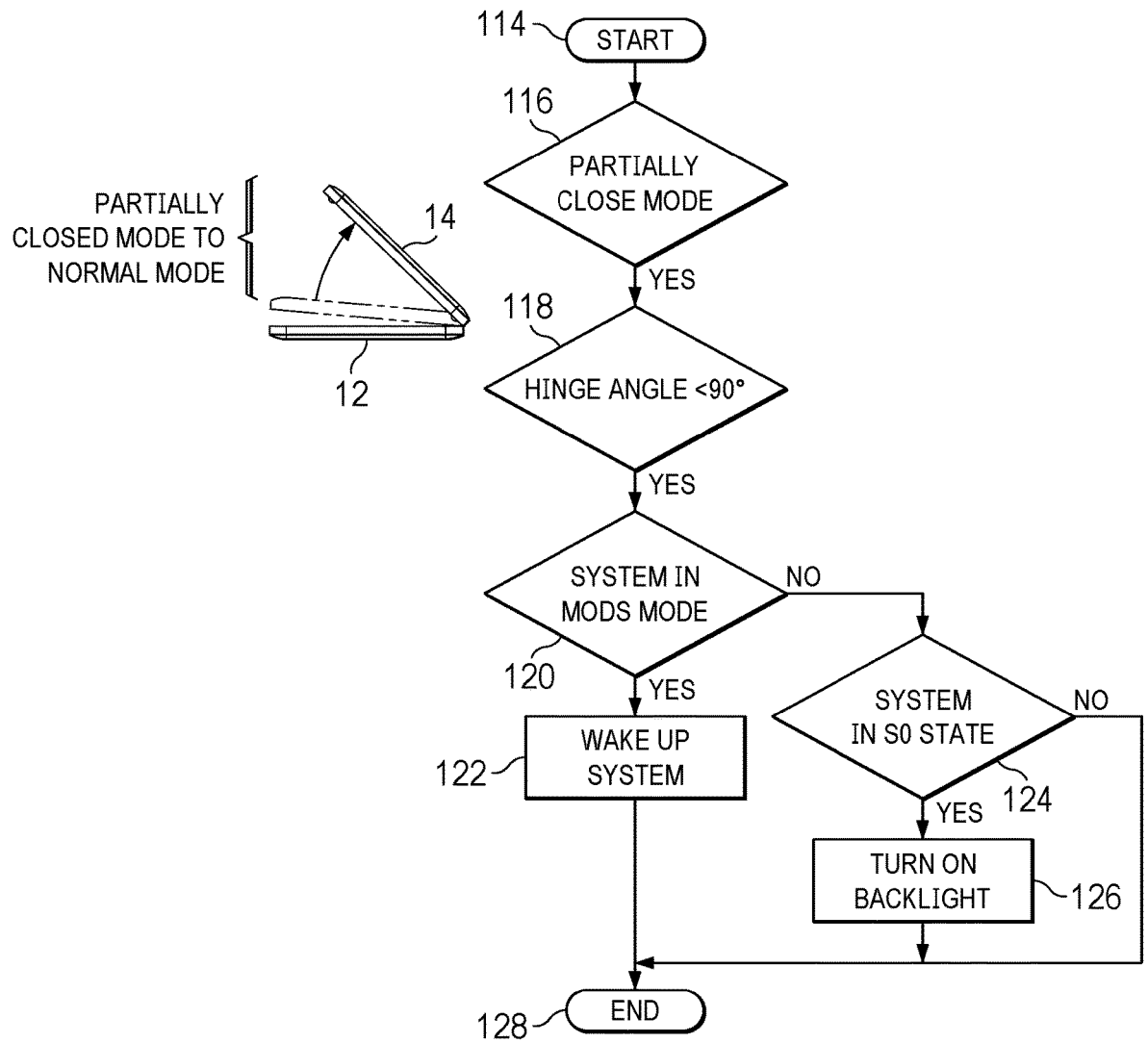
FIG. 6 depicts a flow diagram of a process for exit from a display low power state.

Referring now to FIG. 6, a flow diagram depicts a process for exit from a display low power state. The process starts at step 114 and at step 116 determines that either the display low power state is commanded with the housing rotational orientation in the range defined as partially closed so that the processor is in an on state and the display backlight is off or the system is waking from a low power state in which the processor and display were off. At step 118 a determination is made of whether the housing rotational orientation is greater than 90 degrees. When the housing rotational orientation is greater than 90 degrees the process continues to step 120 to determine if the system is recovering from a processor sleep state or from a display low power state. If at step 120 the processor is awake and the display is in a low power state, the process continues to step 124 to determine if the ACPI state selected is the S0 on state. If so, the process continues to step 126 to power on the display backlight and ends at step 128. If the processor is in a sleep state at step 124, such as due to a timeout from excessive idle, the process ends at step 128 in the off state. If at step 120 the system is in a sleep state, such as an S3/S4 sleep state or modern standby mode after a closed position is detected, the process continues to step 122 to wake the system according to normal ACPI protocols and the operating system configuration setting.

Although the present invention has been described in detail, it should be understood that various changes, substitutions and alterations can be made hereto without departing from the spirit and scope of the invention as defined by the appended claims.

What is claimed is:

1. An information handling system comprising:
   a portable housing having a lid portion and a main portion rotationally coupled to rotate between a closed position and an open position;
   a processor disposed in the portable housing and operable to execute instructions to process information;
   a memory disposed in the portable housing and interfaced with the processor, the memory operable to store the instructions and information;
   a display integrated in the portable housing lid portion and interfaced with the processor to present the information as visual images; and
   a non-transitory memory storing instructions that when executed on the processor cause:
   presentation of visual images with the processor in an on state when the housing has a first rotational orientation of at least a predetermined amount of the open position;
   sleeping of the processor and display when the housing has a second rotational orientation of at least a predetermined amount of the closed position; and
   commanding a display low power state with the processor in the on state when the housing has a rotational orientation between the first and second rotational orientations, the display low power state turning off at least touch detection at the display while continuing to scan visual images to the display.

2. The information handling system of claim 1 wherein:
   the first rotational orientation is a range from 80 degrees open to full open; and
   the second rotational orientation is a range from closed to 15 degrees open.

3. The information handling system of claim 1 wherein the display comprises a liquid crystal display and the display low power state powers down a backlight and a touch detection layer.

4. The information handling system of claim 1 wherein the display comprises a liquid crystal display and the display low power state powers down a backlight and continues generating visual images at a display panel.

5. The information handling system of claim 1 wherein the display comprises a liquid crystal display and the display low power state powers down a backlight and a touch detection layer, and the low power state continues generating visual images at the display panel.

6. The information handling system of claim 1 wherein the display comprises an organic light emitting diode display film and the display low power state powers off the display film.

7. The information handling system of claim 1 further comprising instructions stored in the non-transitory memory that when executed on the processor cause:
   determining when a peripheral display presents the information as visual images; and commanding the display low power state only when a peripheral display presents the information as visual images.

8. The information handling system of claim 1 further comprising instructions stored in the non-transitory memory that when executed on the processor cause:
determining when a peripheral display is not interfaced with the processor; and
commanding the display low power state to include sleeping a graphical processing unit with the processor in the on state.

9. The information handling system of claim 1 further comprising:
a first accelerometer coupled to the housing lid portion;
a second accelerometer coupled to the main portion; and
a controller interfaced with the first and second accelerometers to determine the housing rotational orientation.

10. A method for managing information handling system power consumption, the method comprising:
presenting visual images at an integrated display of the information handling system with a processor of the information handling system in an on state when a housing of the information handling system has a first rotational orientation of at least a predetermined amount of an open position;
sleeping the processor and the display when the housing has a second rotational orientation of at least a predetermined amount of a closed position; and
commanding a display low power state with the processor in the on state when the housing has a rotational orientation between the first and second rotational orientations the display low power state powering off touch detection while continuing to scan pixel values to the display.

11. The method of claim 10 wherein:
the first rotational orientation is a range from 80 degrees open to full open; and
the second rotational orientation is a range from closed to 15 degrees open.

12. The method of claim 10 wherein the display comprises a liquid crystal display and the display low power state powers down a backlight and a touch detection layer.

13. The method of claim 10 wherein the display comprises a liquid crystal display and the display low power state powers down a backlight and continues generating visual images at a liquid crystal display panel.

14. The method of claim 10 further comprising:
determining when a peripheral display presents the information of the information handling system as visual images; and
commanding the display low power state only when a peripheral display presents the information as visual images.

15. The method of claim 10 further comprising:
determining when a peripheral display is not interfaced with the information handling system; and
commanding the display low power state to include sleeping a graphical processing unit with the processor in the on state.

16. The method of claim 10 further comprising:
measuring a first orientation of a lid portion of the housing with a first accelerometer;
measuring a second orientation of a lid portion of the housing with a second accelerometer; and
comparing the first and second orientations to determine the housing rotational orientation.

17. A system for managing power at an information handling system, the system comprising:
a processor operable to execute instructions; and
a non-transitory memory interfaced with the processor and storing instructions that when executed on the processor cause:
presentation of visual images with the processor in an on state when the housing has a first rotational orientation of at least a predetermined amount of the open position;
sleeping of the processor and display when the housing has a second rotational orientation of at least a predetermined amount of the closed position; and
commanding a display low power state with the processor in the on state when the housing has a rotational orientation between the first and second rotational orientations, the low power state turning off power for touch detection while continuing to scan visual image information to pixels of the display.

18. The system of claim 17 wherein:
the first rotational orientation is a range from 80 degrees open to full open; and
the second rotational orientation is a range from closed to 15 degrees open.

19. The system of claim 17 wherein the display comprises a liquid crystal display and the display low power state powers down a backlight of the liquid crystal display.

20. The system of claim 17 wherein the instructions further comprise:
determining when a peripheral display presents the information of the information handling system as visual images; and
commanding the display low power state only when a peripheral display presents the information as visual images.

* * * * *